(12) United States Patent
Unruh (10) Patent No.: US 7,362,716 B2
(45) Date of Patent: Apr. 22, 2008

(54) SYSTEM AND METHOD FOR RELIABLE COMMUNICATIONS OVER MULTIPLE PACKET RF NETWORKS

(76) Inventor: Lincoln J. Unruh, 9249 S. Broadway, Bldg. 209, Suite 239, Highland Ranch, CO (US) 80129

( * ) Notice: Subject to any disclaimer, the term of this patent is extended or adjusted under 35 U.S.C. 154(b) by 17 days.

(21) Appl. No.: 11/475,545

(22) Filed: Jun. 27, 2006

(65) Prior Publication Data

US 2007/0014270 A1   Jan. 18, 2007

Related U.S. Application Data

(63) Continuation of application No. 10/086,182, filed on Feb. 26, 2002, now Pat. No. 7,068,610.

(51) Int. Cl.
*H04J 1/16* (2006.01)

(52) U.S. Cl. ...................... 370/252; 370/329; 370/437; 709/220

(58) Field of Classification Search ................ 370/252, 370/278, 329, 338, 437, 493; 709/220–222, 709/203
See application file for complete search history.

(56) References Cited

U.S. PATENT DOCUMENTS

2006/0176850 A1* 8/2006 Gan et al. .................... 370/329
2007/0073805 A1* 3/2007 Jorgensen .................... 709/203

* cited by examiner

*Primary Examiner*—John Pezzlo
(74) *Attorney, Agent, or Firm*—Ivan Posey; Chan Law Group LLP (57) ABSTRACT

The invention is a method and system for mobile communications. A mobile communicator communicates with a network routing center. The communicator monitors each of two or more wireless carriers for a service characteristic. The communicator selects, based on the monitored service characteristic, one of the two or more wireless carriers. The mobile communicator can then communicate with the network routing center using the selected wireless carrier.

16 Claims, 11 Drawing Sheets

SYSTEM AND METHOD FOR RELIABLE COMMUNICATIONS OVER MULTIPLE PACKET RF NETWORKS

This application is a continuation of U.S. application Ser. No. 10/086,182 filed Feb. 26, 2002 now U.S. Pat No. 7,068,610.

FIELD OF THE INVENTION

This invention relates generally to the field of wireless communications systems. Specifically, the invention is an improved system and method for providing reliable communications over multiple packet radio frequency (RF) networks.

BACKGROUND OF THE INVENTION

The challenge faced today is that several RF wireless networks exist (satellite, terrestrial, wideband and narrow band) in frequency ranges from AM broadcast through to the high gigahertz for satellite transmission and also with a myriad of technology or air interfaces. Individually, a single RF network may not complete a desired solution but if combined with another type of RF network or networks would be ideal.

Several current technologies allow for frequency band and network switching, allowing mobile communicators to select the available carrier in the region through which they are passing. For example, U.S. Pat. No. 4,901,307, issued to Gilhousen et al., and assigned to Qualcomm, Inc., describes a multiple access, spread spectrum communication system and method for providing high capacity communications to, from, or between a plurality of system users, using code-division-spread-spectrum communication signals. The system described therein uses various configurations of circuitry and power level variation to allow for dynamic carrier switching, including between satellite carriers and terrestrial carriers. Such a system may be used by the system of the present invention to accomplish carrier switching, and therefore the contents of U.S. Pat. No. 4,901,307 is hereby incorporated by reference in full herein.

None of the prior art systems, though, provide optimal carrier selection based on quality of service issues, least cost routing and/or characteristics of the data that is being sent. Nor do prior art systems provide one or more hubs or network routing systems that verify service for the mobile communicators and perform message path routing. Nor do prior art systems provide automatic lookup of the current carriers being used by each mobile communicator at a network routing center.

SUMMARY OF THE INVENTION

The problems and shortcomings of the prior art described above and other problems and shortcomings are solved by the systems and methods of the present invention. A transceiver, also called a communications management module (CMM) or mobile communicator is provided and may comprise a mobile hardware plus software apparatus that is configurable dynamically or over-the air to communicate via various radio frequency, microwave, infrared, laser, satellite, and terrestrial networks that exist both today and as well as in the future with technology advancements. The transceiver, comprises a medium access controller. A first set of control logic is in the medium access controller that configures the transceiver for communicating over two or more wireless carriers with a network routing center.

A second control logic in the medium access controller monitors each of the two or more wireless carriers for one or more service characteristics which are part of an air interface personality for each wireless carrier. A third control logic in the medium access controller further selects, based on the monitored service characteristic, one of the two or more wireless carriers that the first control logic configures the transceiver to use to communicate with the network routing center.

DETAILED DESCRIPTION OF THE INVENTION

Figure 1:
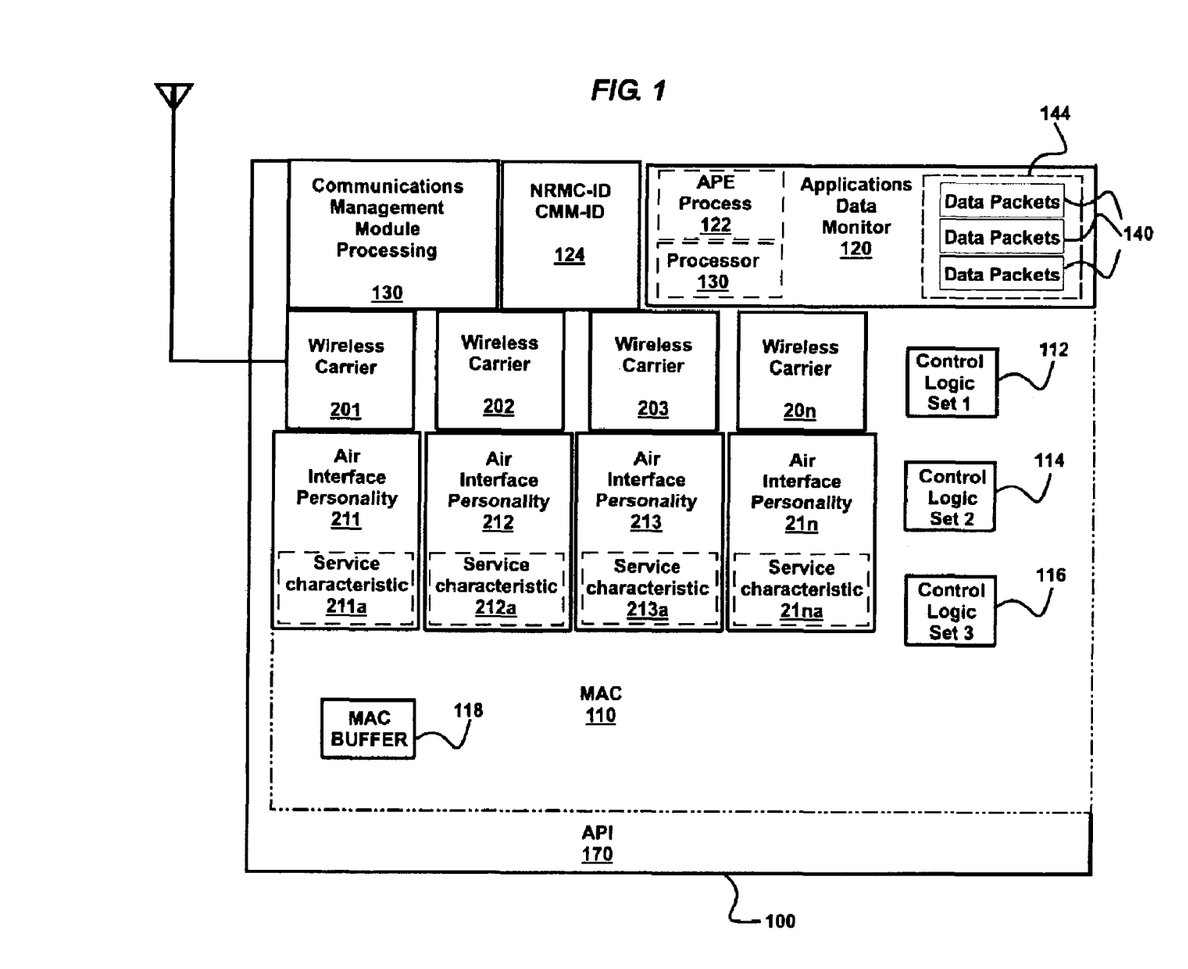
FIG. 1 is a block diagram illustrating the components of a mobile communicator according to an embodiment of the present invention.
Figure 2:
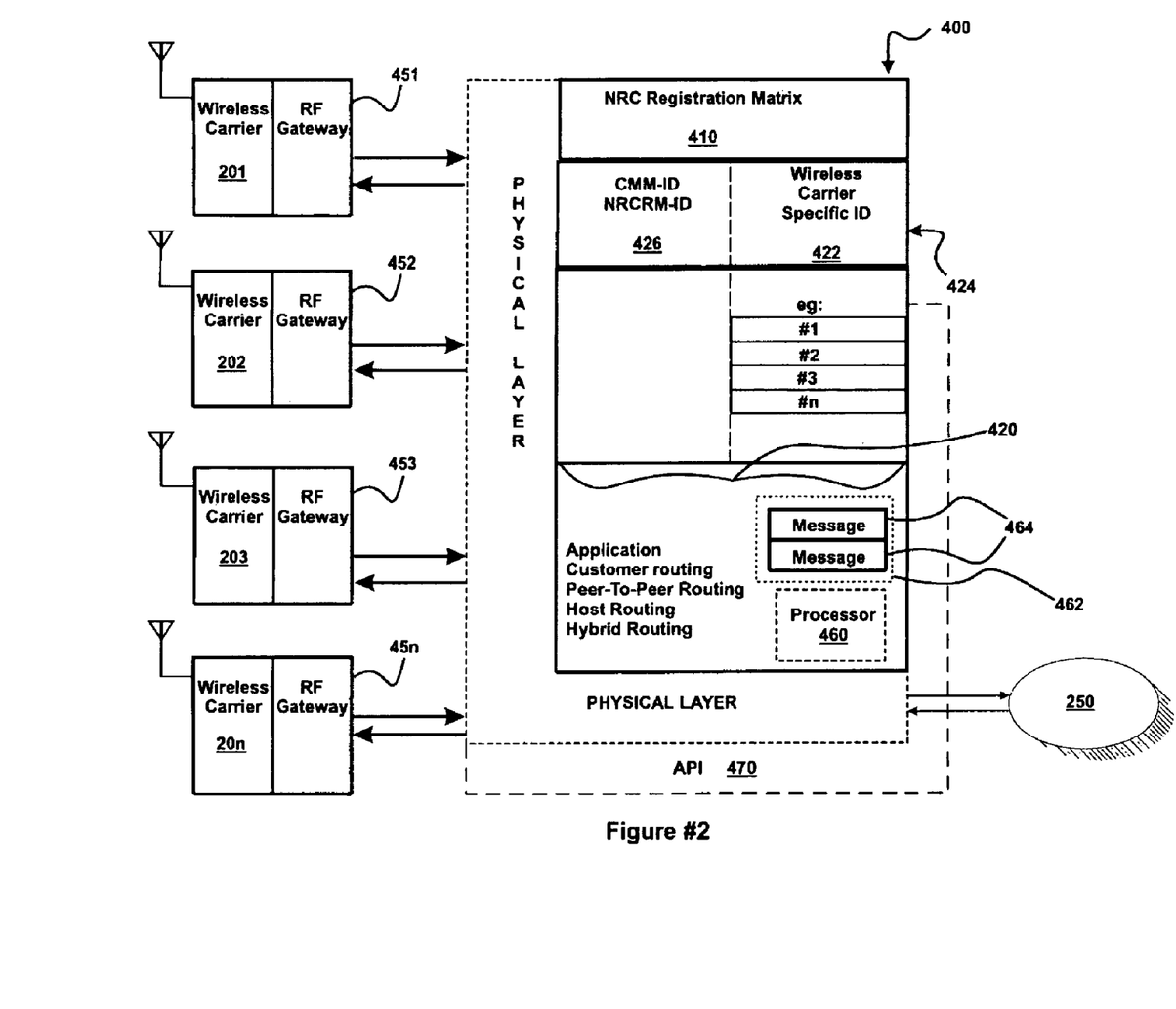
FIG. 2 is a block diagram illustrating the components of a network routing center according to an embodiment of the present invention.

With reference to FIGS. 1 and 2, block diagrams illustrating the components of an embodiment of the present invention is shown. A transceiver 100, also called a communications management module (CMM) or mobile communicator, may comprise a mobile hardware plus software apparatus that is configurable dynamically or over-the air to communicate via various radio frequency, microwave, infrared, laser, satellite, and terrestrial networks that exist both today and as well as in the future with technology advancements. The transceiver, 100 comprises a medium access controller 110. A first set of control logic 112 is in the medium access controller 110 that configures the transceiver 100 for communicating over two or more wireless carriers 201-203, 20*n* with a network routing center 400. Examples of wireless carriers 201-203, 20*n* on which the transceiver 100 can be configured to transmit over include: code division multiple access (CDMA), cellular digital packet data, 1XRTT, time division multiple access (TDMA), global system for mobile communications, general packet radio service, enhanced data rates for global evolution, wide band code division multiple access, ARDIS, MOBITEX or IRIDIUM. CDMA and TDMA may, for example, include implementations of satellite carriers as well as terrestrial wireless carriers. Satellite carriers, such as the IRIDIUM system and others, have been proven to operate with mobile transceivers 100, even of the hand-held variety.

The NRC 400 may interface the specific satellite and terrestrial networks with wire and optical based physical interfaces (such as T1, Ethernet, ATM, Frame relay, TCP/IP etc). By using applications program interfaces (APIs) (170 in FIG. 1 and 470 in FIG. 2) that are consistent in the CMM 100 and NRC 400, there is no need to reconfigure user applications, nor a need for multiple hardware terminals at the mobile location. This system also has the advantage in that no matter how dynamic the communication need is, constant flexibility exists without redesign of the user applications, APIs (170 in FIG. 1, 470 in FIG. 2) and hardware.

A second control logic 114 in the medium access controller 110 monitors each of the two or more wireless carriers 201-203, 20*n* for a service characteristic 211*a*-212*a*, 21*na* which is part of the air interface personality 211-213, 21*n* for each wireless carrier 201-203, 20*n*. A third control logic 116 in the medium access controller 110 further selects, based on the monitored service characteristic 211*a*-212*a*, 21*na*, one of the two or more wireless carriers 201-203, 20*n* that the first control logic 112 configures the transceiver 100 to use to communicate with the network routing center 400.

Each control logic 112-116 is comprised of a hardware based control logic, software based control logic or a combination hardware-software based control logic. Those skilled in the art would appreciate that software based control logic comprises software that causes the hardware components of the transceiver 100 to produce radio signals of the proper strength, frequency, amplitude, etc. for transmission over one of the wireless carriers 201-203, 20*n* based on the measured service characteristic 211-213, 21*n*. Those skilled in the art would further appreciate that the software based control logic could alternatively be implemented using hardware based or hardware-software based control logic.

The service characteristic 211*a*-213*a*, 21*na* may comprise, for example, a quality of service characteristic or a least cost routing characteristic. Examples of quality of service characteristics include a bit error rate, a signal to noise ratio, a packet loss rate, path fade, packet latency or network latency for the respective wireless carrier 201-203, 20*n*.

An application program interface 170 is included with the transceiver 100 that is consistent with an application program interface 470 in the network routing center 400 regardless of which of the two or more wireless carriers 201-203, 20*n* are selected by the medium access controller 10. Those skilled in the art are familiar with APIs 170, 470. APIs 170, 470 generally comprise software applications that, as part of API 170, 470 function, shield application programs from system and hardware level calls. This way, the application program can use universal calls to an API structure. The APIs 170 and 470 of the CMM 100 and NRC 400 respectively allow for the software programs, and hardware, to access lower communication level functions without regard to, for example, the specific protocol used for the currently used wireless carrier 201-203, 20*n*.

Figure 3:
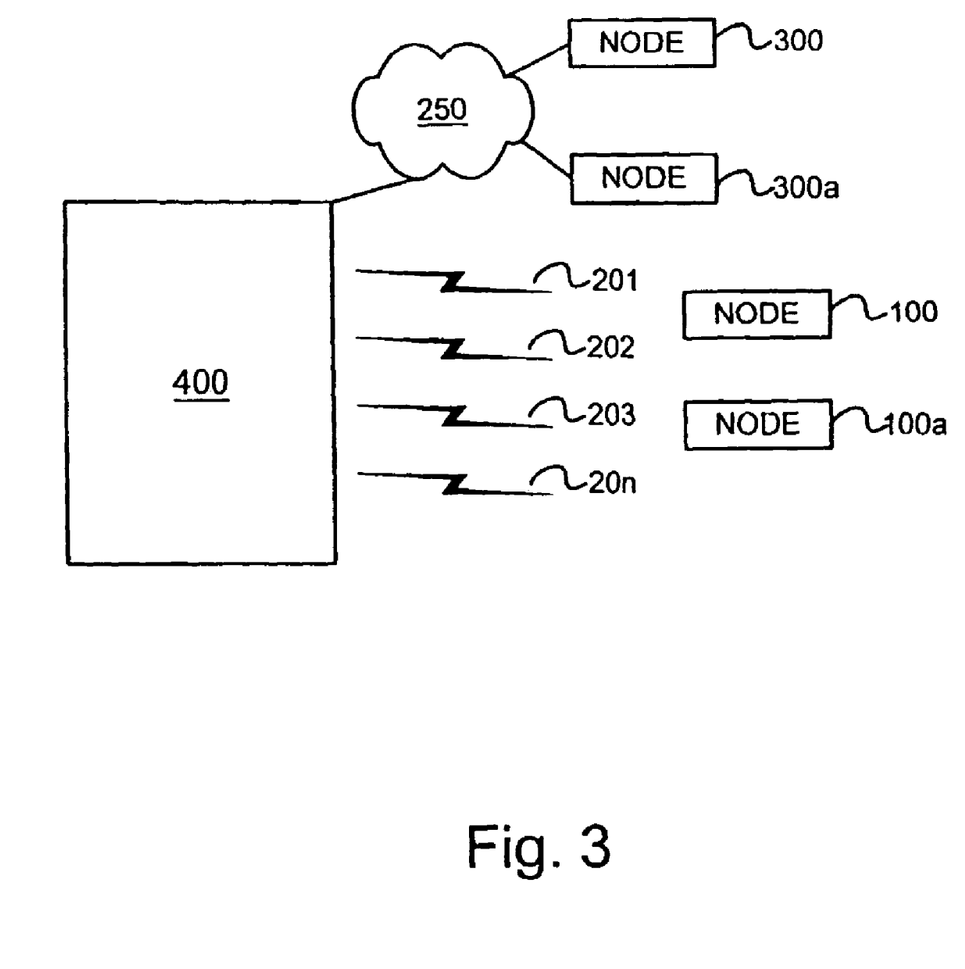
FIG. 3 is a block diagram illustrating the relationship between one or more wireless network systems and a network routing center of FIG. 2, and nodes that communicate with the network routing center.

With reference to FIG. 3, the network routing center 400 may further communicate with one or more nodes 100, 100*a*, 300, 300*a*. In this way, the transceiver 100 of FIG. 1 may communicate with other nodes 100*a*, 300 and 300*a* through the network routing center 400. The network routing center (NRC) 400 handles all of the transmission and reception of information from the mobile communicators 100, 100*a* or groups of mobile communicators 100, 100*a* over the wireless carriers 201-203, 20*n*, also called RF networks 201-203, 20*n*.

One or more of the nodes 100-100*a* may comprise transceivers 100-100*a* such as that described with respect to FIG. 1. Those transceivers 100-100*a* can be dynamically configured to communicate with the network routing center 400 over two or more wireless carriers 201-203, 201*n*; in other words, communication is accomplished using a node-selected wireless carrier selected from the two or more wireless carriers 201-203, 20*n*. The wireless carrier 201-203, 20*n* selected and used by transceivers 100 and 100*a* may be the same or different, depending on the independently selected wireless carrier 201-203, 20*n* selected by a medium access controller 110 in each of the transceivers 100 and 100*a* as described above with respect to FIG. 1.

One or more other nodes 300, 300*a* may be connected to the network routing center 400 through a terrestrial network 250 which may either be wide or local in type. For example, nodes 300 and 300*a* may comprise desktop computers connected to the terrestrial network 250 using modems and dialup lines, cable television systems, digital subscriber lines, or other hard wired terrestrial or wireless local area networks familiar to those skilled in the art. For example, the network routing center 400 may transmit information to nodes 300, 300*a* by means of standard TCP/IP, Ethernet, T1/E1, LAN, WLAN, etc.

In one embodiment, the transceiver 100 uses messages or data packets 140 for reception and transmission. For communication using data packets 140, the transceiver 100 may comprise an applications data monitor (ADM) 120 having a message buffer 144. The ADM 120 may comprise either a set of software program instructions to be executed on a processor 130 in a transceiver main processor 130 or an independent ADM 120 processor to execute those instructions.

The transceiver 100 includes a processor 130, wherein one of its functions is processing the data packets 140. The processor 130 may comprise an integrated circuit (hardware), coded instructions stored in non-volatile and/or volatile memory (software) in combination with an integrated circuit. Part of the processing of the data packets 140 comprises determining a message type, priority, packet length, destination and air interface availability for each data packet 140. The message type, priority, packet length, destination and air interface are influenced by the software application running on the electronic device, such as a computer or cell phone, using the transceiver. 100. The ADM 120 internal to the CMM 100 determines the message type, priority and air interface. The medium access controller 110 selects a wireless carrier 201-203, 20*n* based on one or more of the determined message type, priority, packet length, destination and air interface for each data packet 140. The medium access controller 110 is further for converting each data packet 140 to an appropriate protocol based on the one selected wireless carrier 201-203, 20*n*.

One example of a protocol that a wireless carrier 201-203, 20*n* may use, for which the medium access controller 110 must format the data packets 140 appropriately for transmission, is described in U.S. Pat. No. 5,832,028 entitled "METHOD AND APPARATUS FOR COHERENT SERIAL CORRELATION OF A SPREAD SPECTRUM SIGNAL," issued to Durrant et al. on Nov. 3, 1998. In the system described in that patent, a technique for modulating and demodulating CPM spread spectrum signals and variations of CPM spread spectrum signals is used. If a wireless carrier, for example, 203, uses that technique, then the medium access controller 110 prepares the data packets 140 so that their representative signals may be divided each into a plurality of data streams (such as I and Q data streams) for independent modulation of the I and Q data streams using CPM or a related technique. The medium access controller 110 then superposes the plurality of resultant streams for transmission so that the NRC 400 may receive the superposed spread spectrum signal and simultaneously attempt to correlate for a plurality of chip sequences and demodulation.

With reference back to FIGS. 1 and 2, the invention may also be characterized as a network routing center 400 for communication with transceivers 100, 100a and other nodes 300, 300a as described with respect to FIG. 3 above. The network routing center 400 includes a registration matrix 410, or database 410, for storing one or more carrier indicators 422 for indicating the current wireless carrier 201-203, 20n for each of one or more transceivers 100, 100a. The registration matrix 410 ties a unique communicator identifier 426 in the matrix 410 to a wireless carrier 201-203, 20n. Each stored communicator identifier 426 corresponds to a transceiver 100 that the network routing center 400 is capable of communicating with. A corresponding communicator identifier 124 is stored in each transceiver 124 that is transmitted with each message (140 in FIG. 4 discussed below) so that the network routing center 400 may determine the transceiver 100 from which each message 140 is received. The registration matrix 410 allows for speedy lookup of communicator identifier 426 to determine the particular wireless network 201-203, 20n being used by the relative transceiver 100. The network routing center 400 includes two or more wireless carrier or radio frequency gateways 451-453, 45n which are for interfacing with the wireless carriers 201-203, 20n for communicating with the one or more transceivers 100, 100a that are remote from the network routing center 400. Each of the radio frequency gateways 451-453, 45n communicate with one or more communications hardware systems for a particular wireless carrier 201-203, 20n, for example, a cell phone tower or satellite dish equipment. Each of gateways 451-453, 45n contains software or hardware that takes the resultant raw data that is the output of the particular communications equipment, and converts or strips the raw data to produce packet data in the form described with respect to FIG. 4 below, which is readable to the network routing center 400, and converts outgoing packet data into a form for transmission over the particular communications equipment. Those skilled in the art may describe this function of gateways 451-453, 45n as protocol conversion. Other functions that may be performed by gateways 451-453; 45n include determination of transmission costs, carrier load sensing, security functions, per packet billing processing, etc.

The transceivers 100, 100a that are remote from the network routing center 400 are also referred to herein as mobile communicators 100, 100a. Each gateway 451-453, 45n included in the network routing center 400 interfaces with a different wireless carrier 201-203, 20n. A processor 460 is included in the network routing center 400 that, as part of its functionality, is used for updating each of the one or more carrier indicators 422 to reflect the wireless carrier 201-203, 20n depending on which gateway 451-453, 45n receives a message 464 from the respective mobile communicator 100, 100a that transmitted the message 464. The processor 460 may comprise an integrated circuit (hardware), coded instructions stored in non-volatile and/or volatile memory (software) in combination with an integrated circuit. The network routing center 400 comprises a received message buffer 462 for storing each message 464 received from a mobile communicator 100, 100a.

Figure 4:
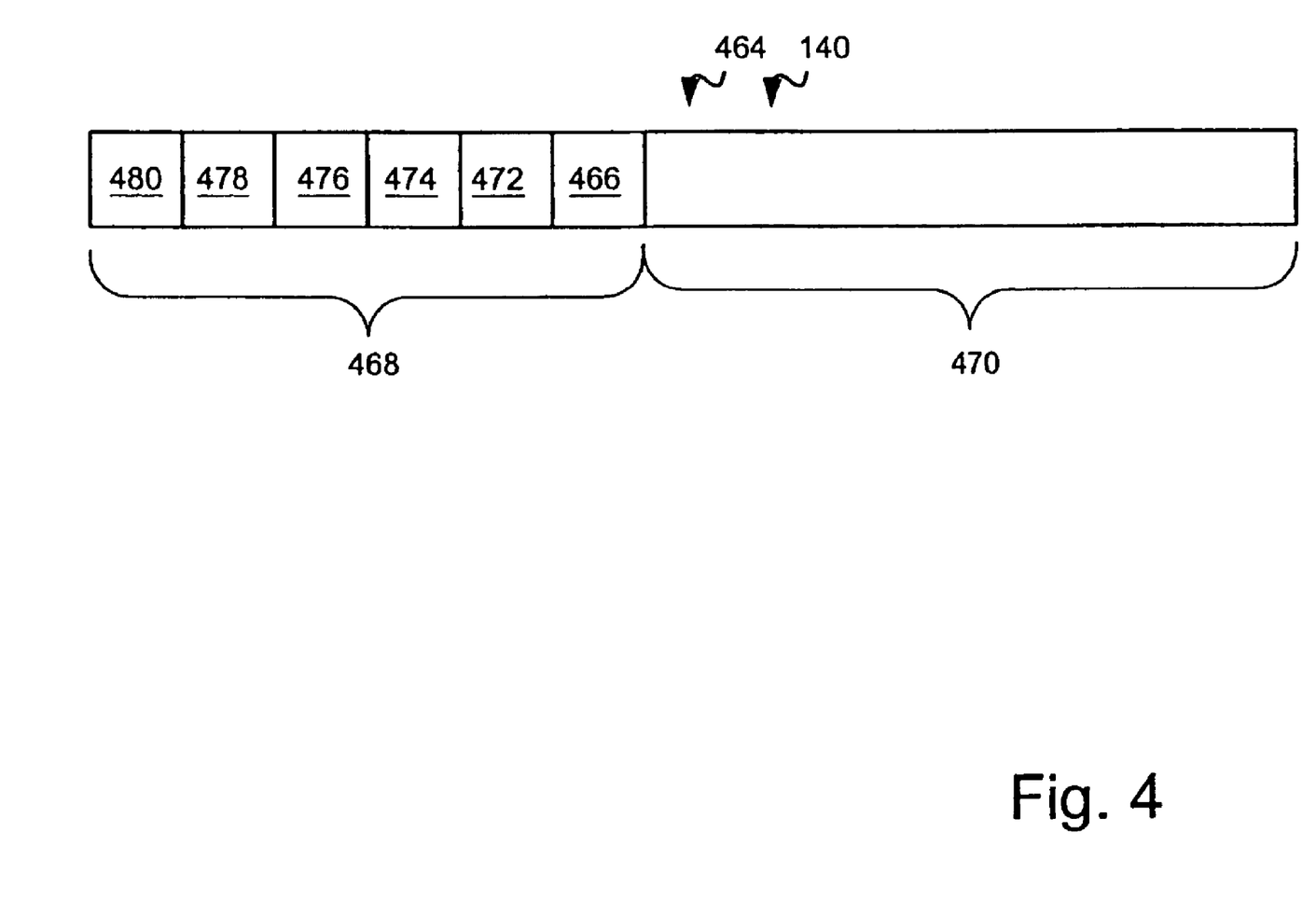
FIG. 4 is a block diagram illustrating a packet structure that could be used as a data structure for communication in the systems of FIGS. 1-3.

With reference to FIG. 4, each message 464, 140 in a header portion 468, or as part of a body portion 470, comprises a communicator identifier 466 (CMM-ID) for identifying the respective mobile communicator 100, 100a that transmitted the message 464, 140. Messages 464 stored in the network routing center 400 may also have the same structure as message 140 stored in the mobile communicator 100. Each message 464, 140 may also comprise a message type 472 in the header portion 468 or as part of the body portion 470. Each message type 472 may comprise a type indicator indicating that the message 464 is peer-to-peer, peer-to-client host or hybrid peer-to-peer/peer-to-client host. Peer-to-peer types of messages 464, for example, may be those that are for transmission from one mobile communicator 100 to one or more other mobile communicators 100a.

Peer-to-client host types of messages 464, 140, for example, may be those that are for transmission from a mobile communicator 100 to one or more terrestrial nodes 300, 300a. Peer-to-peer/peer-to-client host types of messages 464, 140, for example, may be those that are for transmission from one mobile communicator 100 to another mobile communicator 100a and/or to one or more terrestrial nodes 300, 300a. Put in other terms, three types of communications are: host connection, peer-to-peer and a hybrid. The host connection is one that is initiated by a host, 300, 300a to deliver information to one or more CMMs 100. 100a, either individually or in a group. The peer-to-peer communication is one that an individual CMM 100 initiates to communicate with another individual CMM 100a or group of CMMs 100, 100a. The hybrid communication is one in which a CMM 100 communicates with another CMM 100a or group of CMMs 100, 100a and one or more hosts 300, 300a.

The message may also include a priority indicator, also called priority 478, for indicating the priority of the message 140,464.

With reference back to FIG. 2, each carrier indicator 422 stored in the registration matrix may be stored in a registration record 424 indexed by a matching communicator identifier 426. The processor 460 may validate each message 424 by searching the registration matrix 410 for the matching communicator identifier 426 that matches the communicator identifier 466 of the message 464. The processor 460 may further be configured to compose a transmission path for each message 464 according to the message type 472. Each message 464 comprises a message destination 474, which may comprise, for example, a network 250 internet protocol (IP) address or a communicator identifier identifying a communicator 100 different from that which sent the message 464. The transmission path would also be created according to its message destination 474. Each message 464 further comprises a communicator identifier 476 for identifying the mobile communicator 100, 100a that transmitted each message 464. These elements may also be included in the messages 140 stored in the mobile communicator 140.

If a message type 472 indicates that the message 464 is for transmitting to one of the mobile communicators 100, 100a, then the processor 460 selects one of the one or more gateways 451-453, 45n, and thereby one of the networks 201-203, 20n, for transmitting the message 464. In this case, the message may have been received from a host-client node 300, 300a (FIG. 3), or from another mobile communicator 100, 100a as described above. The processor 460 then selects which of the gateways 451-453, 45n with which to transmit the message 464 according to the respective carrier indicator 422 for the one mobile communicator 100, 100a identified by the message destination 474 contained in the message 464. In this way, the network routing center 400 may communicate at the same time with the plurality of mobile communicators 100, 100a, over different wireless carriers 201-203, 20n using the different radio frequency gateways 451-453, 45n.

The processor 460 updates each carrier indicator 422 to reflect which radio frequency gateway 451-453, 45n receives messages 464 from the respective mobile communicators 100, 100a. This is how the processor 460 is able to select the proper gateway 451-453, 45n for sending a message 464 if one needs to be sent to a specific mobile communicator 100, 100a.

The system creates a mezzanine system effect. This structure allows for the addition and deletion of any individual wireless carrier 201-203, 20n with simple command changes to the NRC 400 registration matrix processor 460 software instructions. The delivery system is, thus, transparent to the user of a node 300 of CMM 100, but allows for dynamic and total reconfiguration with simple commands at the NRC 400.

Figure 5:
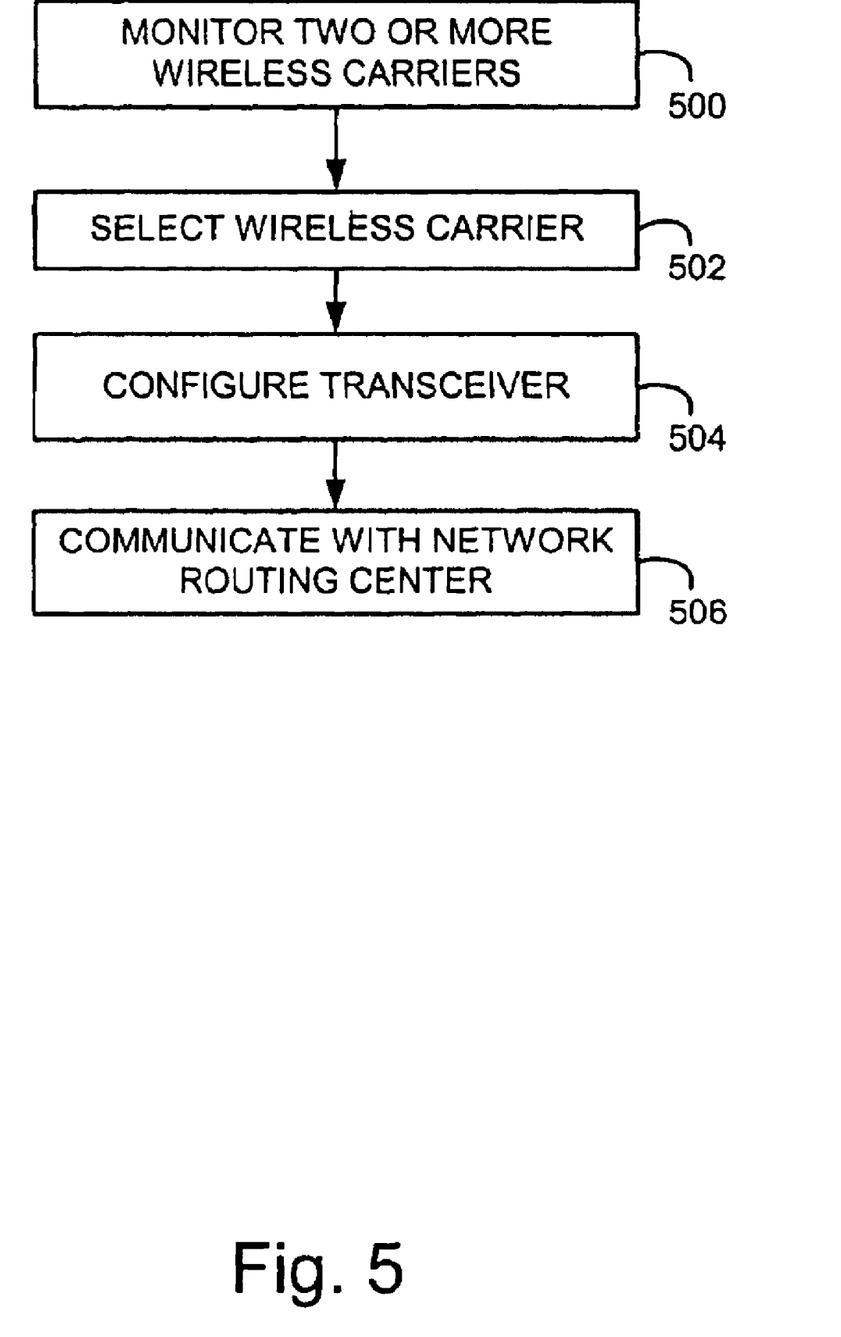
FIG. 5 is a flow diagram illustrating a method performed by transceiver/mobile communicator of FIG. 1.

With reference to FIG. 5, a flow diagram illustrating a method performed by transceiver/mobile communicator 100 of FIG. 1 is shown. The method performed by the transceiver 100 is for communicating with a network routing center 400. Each of the two or more wireless carriers 201-203, 20n is monitored for a service characteristic 211a-213a, 21na, step 500. Based on the monitored service characteristic 211a-213a, 21na, one of the two or more wireless carriers 201-203, 20n is selected, step 502. The transceiver 100 is configured for using the selected wireless carrier 201-203, 20n, step 504. The transceiver 100 then communicates with the network routing center 400 using the selected wireless carrier 201-203, 20n, step 506.

Part of configuring the transceiver 100 to operate using different wireless carriers 201-203, 20n may involve, for example, loading logic or accessing circuitry of the transceiver 100 to operate in different frequency bands and power levels to switch between a terrestrial network 201 and a satellite network 202. Less power may be required for the CMM 100 to communicate with a terrestrial repeater in the terrestrial network 201, given the reduced distance between the CMM 100 and the terrestrial repeater compared with a satellite repeater. Thus, one feature of the transceiver 100 is to vary the power level of the signal depending on the specific network 201-203, 20n used.

The satellite network 202 may have orbital repeaters that can use basically the same circuitry as terrestrial repeaters except that advanced VLSI and hybrid circuit techniques can reduce the size and power consumption in the repeater. Small and light transceivers 100 have been proven for satellite communication, such as the MOTOROLA 9505 portable satellite phone, that can be purchased from Iridium, Inc. of Plano, Tex. The circuitry and configuration of such a light mobile communicator can be integrated with the CMM 100 of the present invention, to be accessed selectively depending on the selection of the carrier 201-203, 20n by the medium access controller 110. A detailed explanation of power, frequency band, and circuitry switching is provided in U.S. Pat. No. 4,901,307 incorporated by reference above.

Figure 6:
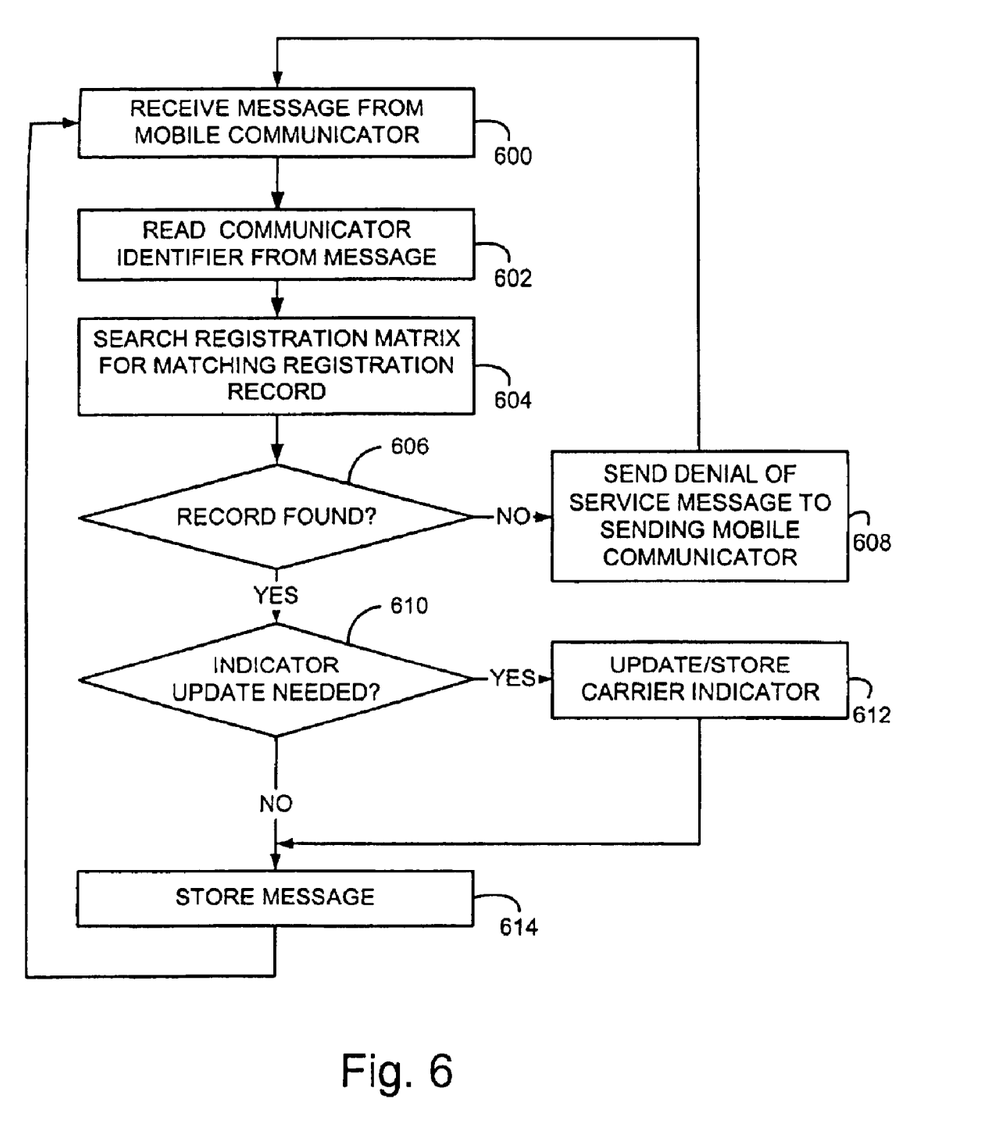
FIG. 6 is a flow diagram illustrating the steps performed by the network routing center of FIG. 2.

With reference to FIG. 6, a flow diagram illustrating the steps performed by the network routing center 400 of FIG. 2 is shown. A message 464 is received by a radio frequency gateway 451-453, 45n, step 600. The processor 460 reads the communicator identifier 466 from the received message 464, step 602. The processor 460 validates the message 464 by searching the registration matrix 410 for a registration record 424 with a matching communicator identifier 426 matched with the communicator identifier 476 stored in the received message 464, step 604. In most systems, only certain mobile communicators 100, 100a, identified by this search, may communicate through the network routing center 400 due to subscriber or security features configured into the processor 460. If a matching registration record 424 is not found, then the processor 460 may cause a return message to be sent back to the mobile communicator 100, 100a that sent the received message 464 to advise the mobile communicator 100, 100a that use of the network routing center 400 is denied, step 608.

The processor 460 checks for whether the carrier indicator 422 stored in the matched registration record 424 reflects the wireless carrier 201-203, 20n of the gateway 451-453, 45n that received the message 464, step 610. If not, then the carrier indicator 422 is updated (stored if first contact is made) in the registration matrix 410, step 612. The received message 464 is stored in the message buffer 462, step 614.

Figure 7:
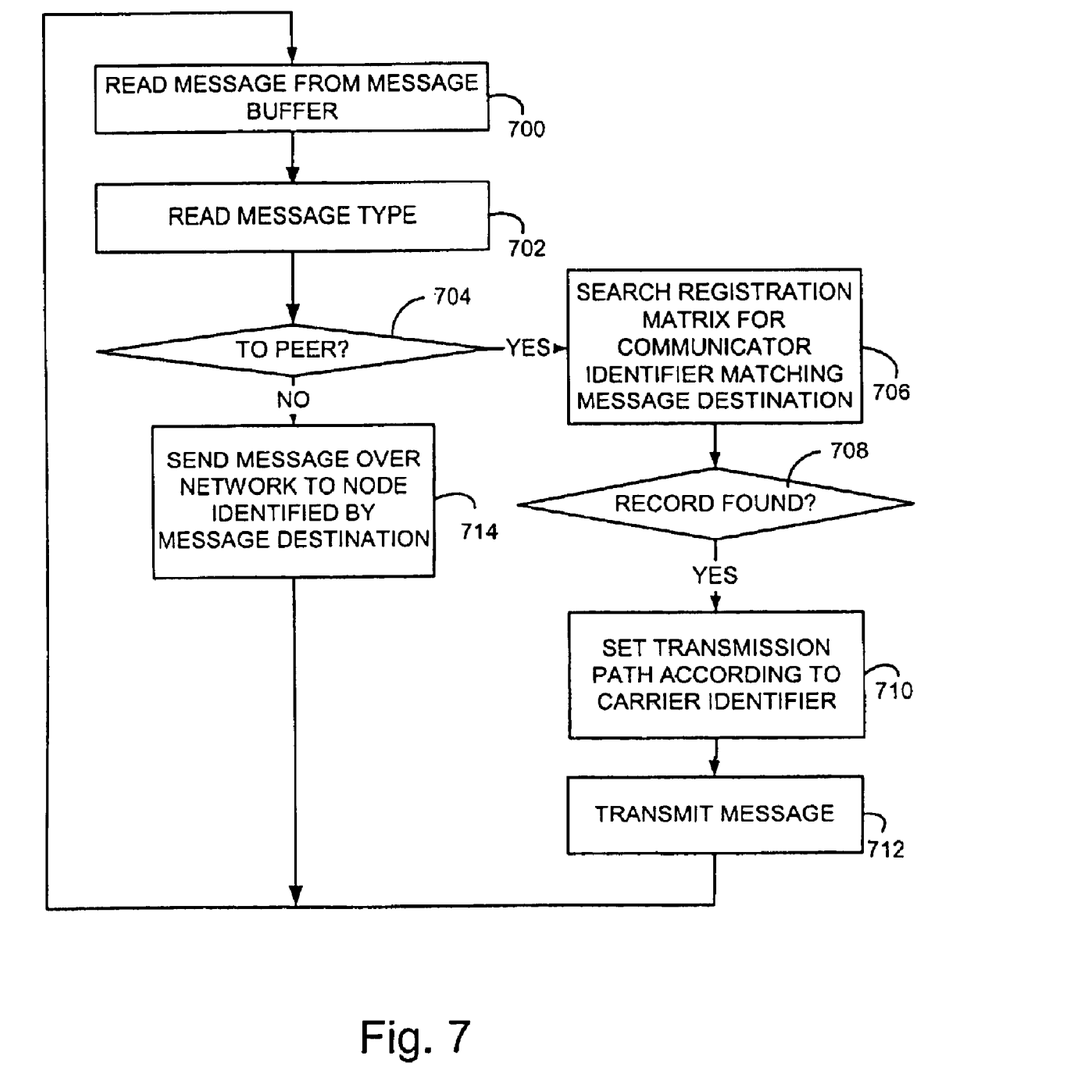
FIG. 7 is a flow chart illustrating the steps in another method performed by the network routing center of FIG. 2.

With reference to FIG. 7, a flow chart illustrating the steps in another method performed by the network routing center 400 is shown. The method of FIG. 7 describes the steps for transmission of messages 464 from the network routing center 400. The next message 464 for transmission is read from the message buffer 462, step 700. The message type 472 is read from the header 468, step 702. The processor 460 determines whether the message type 472 is a 'to-peer type message 464 (to mobile communicator 400), step 704. If so, then the processor 460 reads the message destination 474 and searches the registration matrix 410 for the matching communicator identifier 426, step 706. If the message destination 474 is matched with a registration record 424, step 708, the processor 460 sets the transmission path for the message 464 for transmission using the wireless carrier 201-203, 20n identified by the carrier identifier 422, step 710. The message 454 is transmitted to the mobile communicator 100, 100a identified by the message destination 474 over the wireless carrier 201-203, 20n identified by the carrier identifier 422, step 712. If a registration record 424 is not found step 706, then the message 464 may have an erroneous message destination 474, and the message 464 is discarded. In that case, the sending node 100, 100a, 300, 300a may or may not be sent a notification.

If the message type 472 indicates that the message 464 is a 'to host type message 464, then the message is routed over the network 250 to the node 300, 300a indicated by the message destination 474, step 714.

Processing moves back to step 700 for processing the next message 464 in the message buffer 462.

With reference back to FIG. 1, the data for the messages 140, also called data packets 140 or clusters of data packets 140, may enter the CMM 100 through a verity of ways, either automatically, from an application program, or manually by the user, for example voice data packets. The data packets 140 may be put into a message buffer 144. The physical data interface can take many forms, data terminal, infrared device, J1708, IEEE 1394, RS-232, RS-485, personal data assistant (PDA), scanner, barcode reader etc. The data input into the CMM 100 routes through the API 170, 470 and into the ADM buffer 144 to await examination by the ADM 120 to determine the following: message type 472 (peer-to-peer, client host or both—hybrid), priority 478; message packet length by measurement of the size thereof; destination 474 and air interface (carrier) selection 480.

Figure 8:
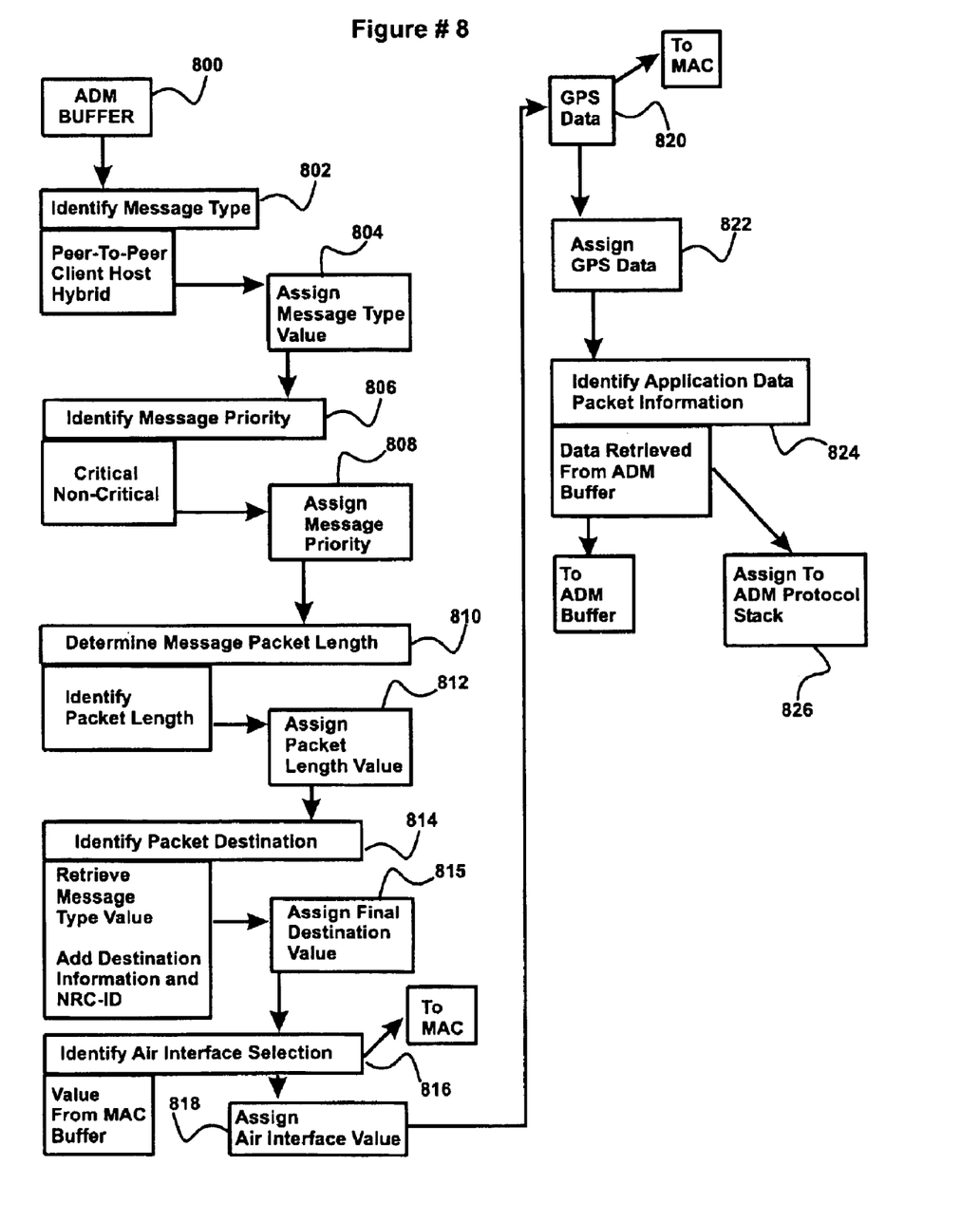
FIG. 8 is a data flow diagram illustrating a method for processing a message in the mobile communicator of FIG. 1.

With reference to FIG. 8, a data flow diagram illustrating a method for processing a message 140 in the CMM of FIG. 1 is shown. The data that enters from the API 170 of the CMM 100 by one of at least two inputs, external from an input device or application, or internal from one of the wireless short-range local area network (WLAN) configurations such as Bluetooth or IEEE 802.11x. As those skilled in the art would recognize, wireless interfaces such as Bluetooth and the IEEE 802.11x can be built into the CMM 100 as permanent functioning interfaces. As the data is processed through the API 170, it is stored in the ADM buffer 144, step 800. Several steps then take place. First the message type 472 is identified, step 802. As stated above, the message has three possible types, peer-to-peer, peer-to-client host, or a hybrid peer-to-peer/client host. The processor 130 may take message type information sent in from the originating application and compare that information to stored message type 472 in the packet 140 in the ADM buffer 144 to facilitate identification of the message type 472. Once this process is complete, a message type value is generated and sent to the ADM buffer 144 to be held as part of the completed ADM buffer 144 for use in the CMM 100, step 804. The next step in the process is the identification of message priority, step 806. The information sent by the application has one of two priority levels, critical or non-critical. The ADM looks at the message priority information sent by the application and compares this information to stored values in the ADM buffer 144 to facilitate identification of the priority level. Once this process is complete, a priority level value is generated and sent to the message 140 in the ADM buffer 808 to be held as part of the completed ADM buffer 144 for use in the CMM 100, step 808. The next step in the process is the identification of the original data field packet length, step 810. The information sent by the application regarding packet length is passed from the API in this portion of the process. The API value is the actual value of the original data field packet length and is sent to the ADM buffer 144 for use in the CMM 100, step 812.

The next step in this process is the identification of the packet destination, step 814. The information sent by the application regarding the identification of the message type 472 is extracted from the ADM buffer 144 and may be combined with anther host or destination value to create final destination information. The output generated by combining these values is then sent to the ADM buffer 144 for use in the CMM 100, steps 815-816.

The next step in this process is the selection of the air interface or wireless network 201-203, 20n that the data will be transferred across, step 818. The medium access controller 110 is responsible for the selection of the wireless network 201-203, 20n that information will be transmitted/received across. The details of channel selection are covered below with reference to FIG. 9. After the RF network selection process is complete, a buffer 118 in the MAC 110 is sent an RF network designator. The MAC buffer 118 is queried and the information is sent to the ADM buffer 144 as part of the completed protocol stack of the ADM 120 for use in the CMM 100, step 818.

The next step may be the addition of global positioning satellite (GPS) information. The GPS information is read from the MAC buffer 118, step 820. The MAC 110 is where GPS receiver circuits may reside. The GPS information is transferred to the ADM buffer 144 as part of the completed protocol stack of the ADM for use in the CMM, step 822. The GPS data is read when a user application may require it to be transmitted.

The next step in the process is the addition of the original data packet to the ADM buffer 144, steps 824-826.

Figure 9:
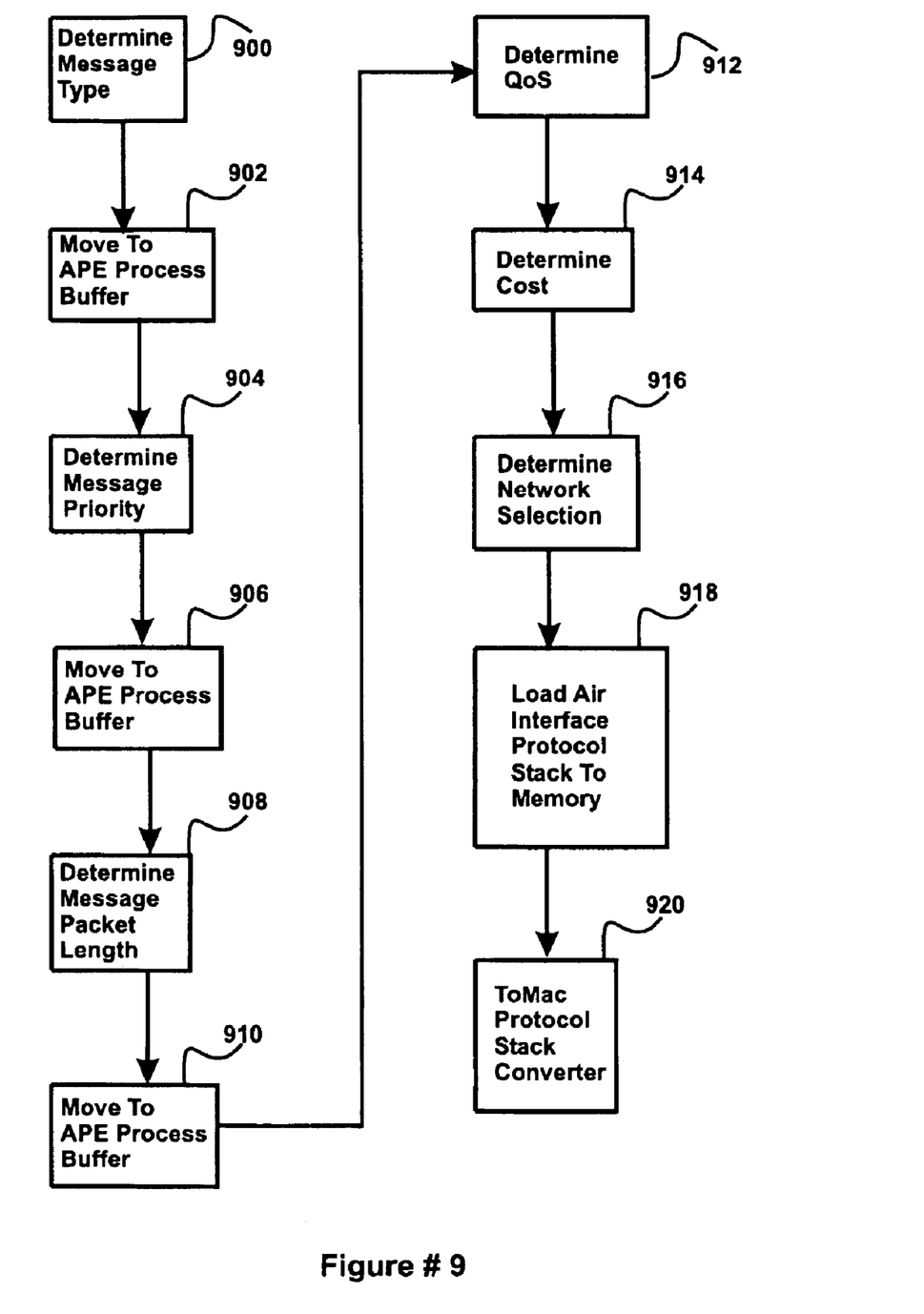
FIG. 9 is a data flow diagram illustrating the details of channel selection performed by the mobile communicator of FIG. 1.

With reference back to FIG. 1, medium access controllers 110 are known to those skilled in the communications technical field and is responsible for protocol conversion and RF network 201-203, 20n selection. The process of RF network 201-203, 20n selection is referred to as the automatic path establishment (APE). With reference to FIG. 9, a data flow diagram illustrating the steps performed for APE is shown. Automatic path selection may be based on the following criteria: quality of service (QoS) and/or least-cost-routing (LoS) based on cost per byte of data.

The MAC 110 may continuously monitor the stored air interface personalities 211-213, 21n and search for available networks 201-203, 20n. In the event that no RF network 201-203, 20n should be available, the data to be sent is stored for future transmission once a valid RF network 201-203, 20n is available.

The APE process queries the information that is stored in the ADM buffer 144. The information of interest to the APE process is the message type 472, message priority 478 and the message packet length, which are moved into an APE process buffer (122 in FIG. 1), steps 900-910. Once the information is sent to the APE process buffer 122, additional considerations are made with regard to completing the APE process. Those considerations include QoS and cost per byte measurements, or least-cost-routing, steps 912-914. The QoS issue will be discussed first.

The quality of service issues regarding the selection of the RF network 201-203, 20n may have several considerations involved. The considerations may be bit error rate (BER), signal to noise ratio (SNR), delay spread, packet loss rate, path fade, packet latency and network latency. These issues may be monitored by the APE process in connection with the network routing center to aid in the APE final selection of the appropriate RF network 201-203, 20n. Each of these characteristics is effectively tested using known methods and the results are stored as an aggregate value in the APE process buffer 122. Another consideration for the APE process may be least-cost-routing.

Information relating to the cost per byte of a particular network 201-203, 20n is stored as part of the air interface personality information 211-213, 21n, 211a-213a, 21na. Additional information stored in the AIP 211-213, 21n database may include the unique CMM-ID 124 (these Ids are one in the same). The Cost per byte information may be continuously updated from the NRC 400 and stored in the AIP database 211-213, 21n. Once the APE process finishes determining the least cost route for the data, network 201-203, 20n selection is made, step 916. The information relating to the particular wireless network 201-203, 20n is extracted from the air interface personality database 211-213, 21n and loaded into a RF digital processing section of memory in the CMM 100 for final configuration for RF network 201-203, 20n use, step 918. Additionally, the air interface personality database 211-213, 21n information is sent to a protocol stack converter 126 so that the ADM buffer 144 can be converted into the appropriate air interface protocol for the selected wireless carrier 201-203, 20n, step 920.

Figure 10:
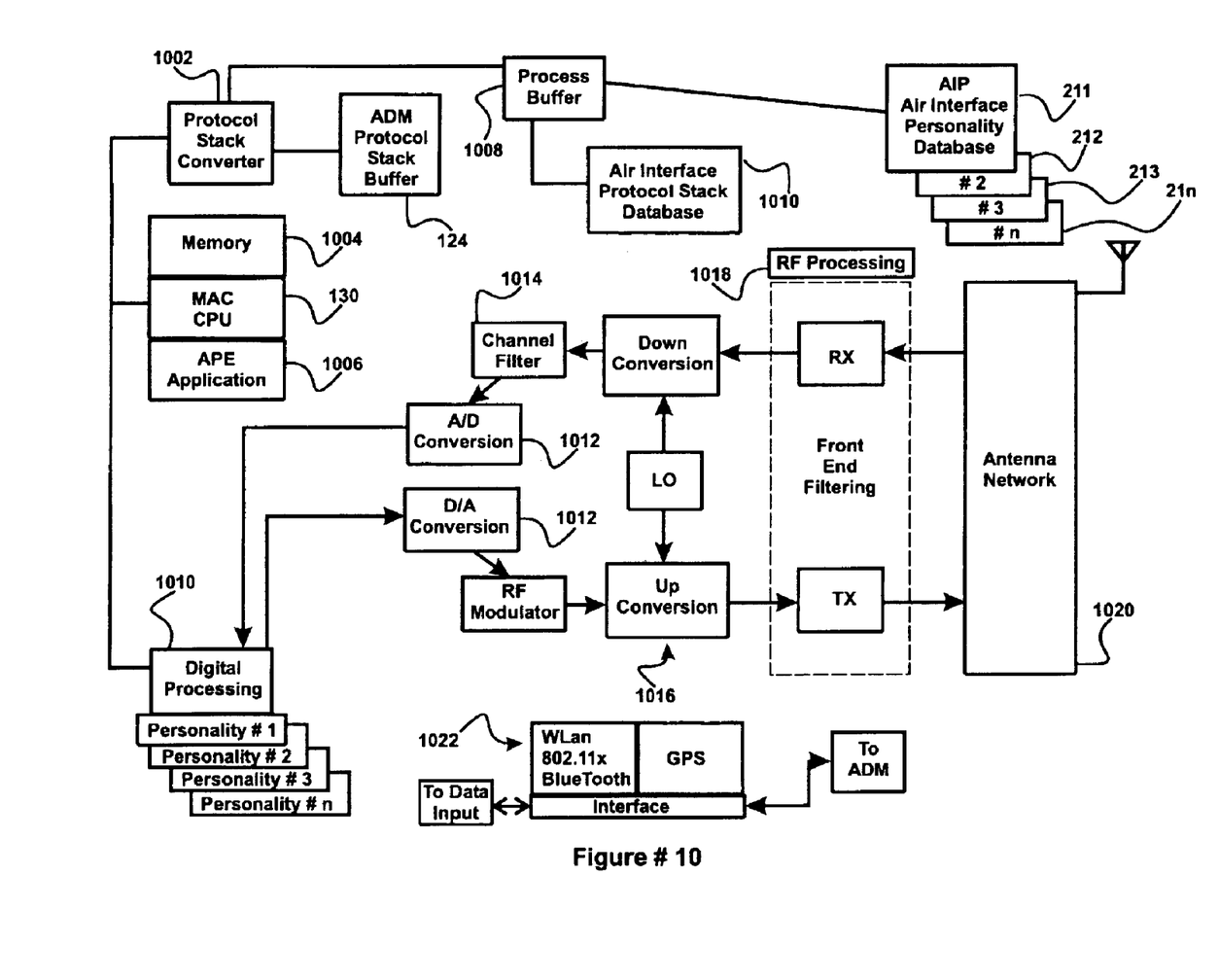
FIG. 10 is a block diagram illustrating some of the components and data flow of the medium access controller included in the system if FIG. 1.

With reference to FIG. 10, a block diagram illustrating some of the components and data flow of the MAC 110 is shown. Once the APE process is completed the information stored in the ADM buffer 144 is accessed by the MAC 110 and the messages 140 are sent to the protocol stack converter 1002 to be converted into the appropriate air interface protocol stack and prepared for transmission to the NRC 400.

The MAC 110 also may have an additional element. The digital processing section, consisting of a processor 130 and APE application 1006, of a memory 1004 may hold a minimum of configuration information for two wireless networks 201-203, 20n loaded at any one time and a maximum number of networks that is equal to the AIP database 211-213, 21n. The reason for this is that it is possible with this configuration to split a message 140 for transmission into sections to send over two different wireless networks 201-203, 20n. For example, a message 140 could be transmitted partially over network 201 and partially over network 203 and recombined at the NRC 400 as one complete message 464.

The MAC may also include components that those skilled in the art would recognize such as processing buffers 1008, databases 1010, digital converters 1012, filters 1014, modulators 1016, signal converters 1016, RF processors 1018, an antenna 1020, and/or wireless local area network interfaces 1022.

Figure 11:
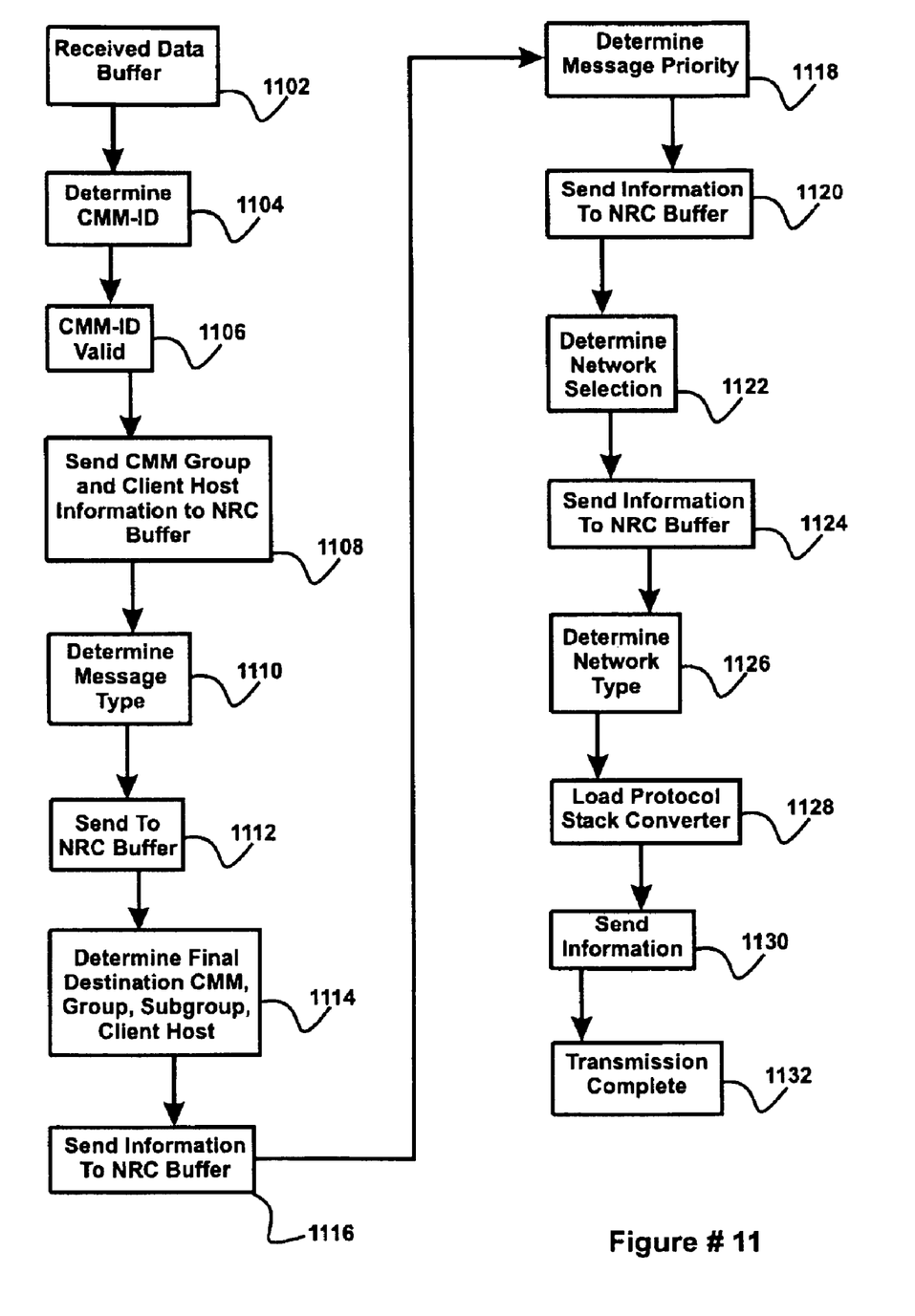
FIG. 11 is a data flow diagram illustrating a method performed by the network routing system of FIG. 2.

With reference to FIG. 11, a data flow diagram illustrating a method performed by the NRC 400 of FIG. 2 is shown. The information sent by the mobile communicator 100 is buffered in the received message buffer 462, step 1102. The next step of the NRC 400 is to process the CMM-ID 466 of the message 464, step 1104. The received data message is then validated by a look-up of the CMM-ID 426 in the NRC registration matrix 410. This look-up establishes validity of the CMM 100, step 1106 and also establishes additional CMMs 100, 100a that are registered in the same group for peer-to-peer messaging and also the client host identification is made for peer-to-client host messaging, step 1108. The next step is the identification of message type 472, peer-to-peer, peer-to-client host or a hybrid, step 1110. This information is extracted from the NRC message buffer 462 and may be sent to another NRC buffer (not shown) for further processing, step 1112. Additionally, when the determination of the message type 472 is made a subset of steps occur. Based on the message type 472 read, the NRC 400 begins to set-up an internal path to complete message transfer. The next step of the process is to determine the final destination 474 of the message 464, steps 1114-1116. The destination 474 may be for a specific CMM 100, 100a or the entire group of CMMs 100, 100a, a sub-group of CMMs 100, 100a or the client-host 300, 300a. The next step in the process is the determination of the message priority, steps 1118-1120. The message priority may affect the setup process slightly in that all high priority messages 464 may go to the client host 300 first and then routed to any CMMs 100, 100a that may be named in the application. The next step in the process is the selection of the wireless network 201-203, 20n for messages 464 that have a CMM as the destination 474. Based on the entry of the mobile communicator 100, 100a in the NRC registration matrix 410 data, the network 201-203, 20n of choice, the protocol stack information (not shown in FIG. 2, but similar to that in FIG. 1) is loaded into a protocol stack converter (not shown in FIG. 2, but similar to that in FIG. 1) and the physical path is determined, steps 1122-1128.

When completed with the identification of the message type 472, final destination 474 and the message priority, the NRC 400 can now establish the path for delivery of the message 464, steps 1130-1132.

In the case of a message transmission for message types 472 peer-to-client host, the message 464 in the NRC buffer 462 is sent to a protocol stack converter for preparation of delivery to the client host 300, 300a. Client host 300, 300a initiated communication is very similar to the CMM 100, 100a initiated communication. They share the same steps and the same components reside in the process. The difference between the two is that the NRC 400 may use AIP, APE and ADM processes that were explained relating to the CMM 100, 100a, when dealing with a client host 300, 300a initiated communication. Essentially the process follows the identical steps to that of the CMM initiated communication.

For peer-to-peer communication, the process in the CMM 100 is the same as previously explained. The minor difference in that case is the routing of the information. In the peer-to-host example, at the NRC 100, data was routed to the host. However, in the peer-to-peer example, the data is routed through one of the RF networks 201-203, 20n to be sent out to another CMM 100, 100a or group of CMMs 100, 100a.

As can be seen by this description, the flexibility is tremendous in that any desired combination of networks 201-203, 20n can be connected at the CMM 100, 100a simply by routing the data of the multiple single networks 201-203, 20n to a network routing center 400 to allow routing to a specific CMM 100, 100a or group of CMMs 100, 100a. The CMMs 100, 100a themselves are configurable over-the air (OTA) to allow for dynamic network or system updating/configuration. Additionally, the problem of incompatible networks 201-203, 20n is eliminated in that a CMM 100 communicating utilizing, for example, carrier 201 can easily communicate with a CMM 100a that is utilizing carrier 202 because of the routing path the data takes throughout the system.

It will thus be seen that changes may be made in carrying out the above system and method and in the construction set forth without departing from the spirit and scope of the invention. It is intended that any and all matter contained in the above description and shown in the accompanying drawings shall be interpreted as illustrative and not in a limiting sense.

What is claimed is:

1. A transceiver comprising:
   (a) a medium access controller;
   (b) a first set of control logic in the medium access controller for configuring the transceiver for communicating over two or more wireless carriers;
   (c) a second control logic in the medium access controller for monitoring each of the two or more wireless carriers for a service characteristic; and
   (d) a third control logic in the medium access controller further for selecting, based on the monitored service characteristic, one of the two or more wireless carriers that the first control logic configures the transceiver to use for communicating.

2. The transceiver of claim 1, wherein each of the first, second, and third control logic is selected from the group consisting of: hardware based control logic, software based control logic and combination hardware-software based control logic.

3. The transceiver of claim 1, wherein the service characteristic comprises a quality of service characteristic for the wireless carrier.

4. The transceiver of claim 3, wherein the quality of service characteristic comprises a bit error rate for the respective wireless carrier.

5. The transceiver of claim 3, wherein the quality of service characteristic comprises a signal to noise ratio for the respective wireless carrier.

6. The transceiver of claim 3, wherein the quality of service characteristic comprises a packet loss rate for the respective wireless carrier.

7. The transceiver of claim 3, wherein the quality of service characteristic comprises path fade for the respective wireless carrier.

8. The transceiver of claim 3, wherein the quality of service characteristic comprises packet latency for the respective wireless carrier.

9. The transceiver of claim 3, wherein the quality of service characteristic comprises network latency for the respective wireless carrier.

10. The transceiver of claim 1, wherein the service characteristic comprises a least cost routing characteristic for the wireless carrier.

11. The transceiver of claim 1, comprising a data packet for transmission.

12. The transceiver of claim 11, comprising an applications data monitor buffer.

13. The transceiver of claim 12, wherein the applications data monitor buffer comprises a packet processor for processing the data packet, said processing comprising determining a message type, priority, packet length, destination and air interface for the data packet.

14. The transceiver of claim 13, wherein the medium access controller is for selecting the one wireless carrier based on one or more of the determined message type, priority, packet length, destination and air interface for the data packet.

15. The transceiver of claim 14, wherein the medium access controller is further for converting the data packet to an appropriate protocol based on the one selected wireless carrier.

16. The transceiver of claim 1, wherein the two or more wireless carriers are each selected from the group consisting of: code division multiple access, cellular digital packet data, 1XRTT, time division multiple access, global system for mobile communications, general packet radio service, enhanced data rates for global evolution, wide band code division multiple access, ARDIS, MOBITEX and IRIDIUM.

* * * * *